United States Patent [19]
Roden

[11] Patent Number: 6,038,318
[45] Date of Patent: *Mar. 14, 2000

[54] OPTIMIZED MACHINE COMPUTATION OF EXPONENTIAL FUNCTIONS AND MODULO FUNCTIONS

[75] Inventor: Tom Roden, Irvine, Calif.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/089,929

[22] Filed: Jun. 3, 1998

[51] Int. Cl.$^7$ .............. H04K 1/00; H04L 9/00; G06F 1/02; G06F 7/38

[52] U.S. Cl. ............. 380/30; 708/277; 708/491; 708/606

[58] Field of Search .............. 380/30; 364/722, 364/746, 753; 708/277, 491, 606

[56] References Cited

U.S. PATENT DOCUMENTS

| | | |
|---|---|---|
| 4,200,770 | 4/1980 | Hellman et al. . |
| 5,289,397 | 2/1994 | Clark et al. ............... 364/746 |
| 5,867,412 | 2/1999 | Suh ........................... 708/491 |
| 5,912,830 | 6/1999 | Krech et al. ............... 708/606 |
| 5,926,406 | 7/1999 | Tucker et al. ............. 708/606 |
| 5,938,315 | 7/1999 | Kobayashi et al. ........ 708/491 |
| 5,954,788 | 9/1999 | Suh et al. .................. 708/491 |
| 5,957,999 | 9/1999 | Davis ......................... 708/606 |

*Primary Examiner*—Gail O. Hayes
*Assistant Examiner*—Hrayr A. Sayadian
*Attorney, Agent, or Firm*—McDermott, Will & Emery

[57] ABSTRACT

An optimized approach for machine computation of exponential values or functions is disclosed. The determination of the exponential values is performed using a "Big Multiply" approach and a "Big Mod" approach which involve dynamically determining the maximum size of an intermediate value required to determine an encryption key and allocating memory sufficiently large to store the maximum size intermediate value so that no additional memory allocation operations are required during the determination of the encryption keys. In addition, iterative multiplication and shift operations are performed on portions of the intermediate value in a cascade fashion to prevent spilling of the intermediate value. In one context, the computation of the exponential values is used in generating a key for exchange in a public key cryptosystem, such as the Diffie-Hellman public key cryptosystem.

18 Claims, 13 Drawing Sheets

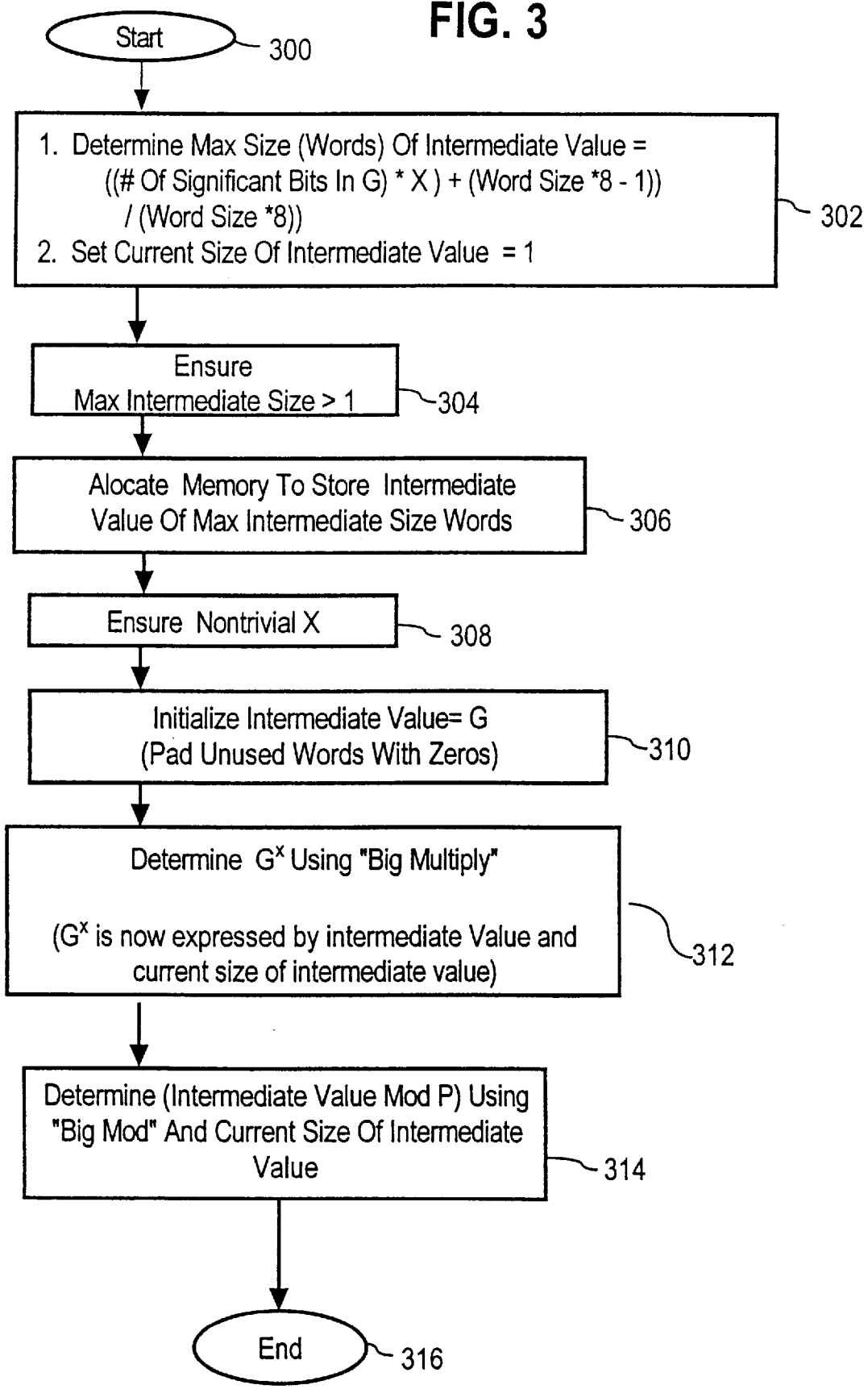

FIG. 5A
Intermediate Value
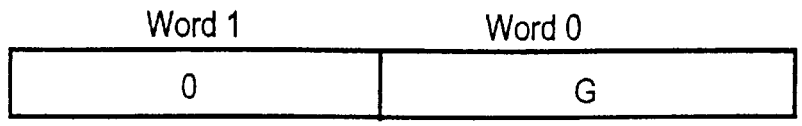
Accumulator
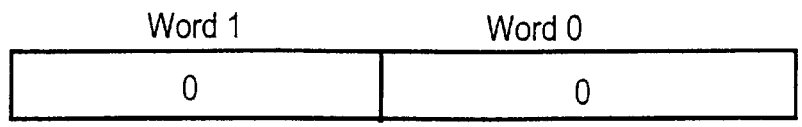
FIG. 5B
Intermediate Value
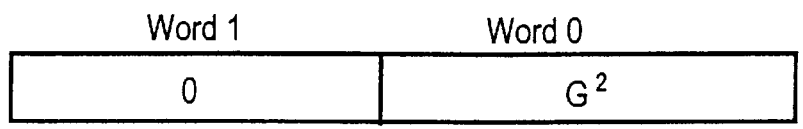
Accumulator
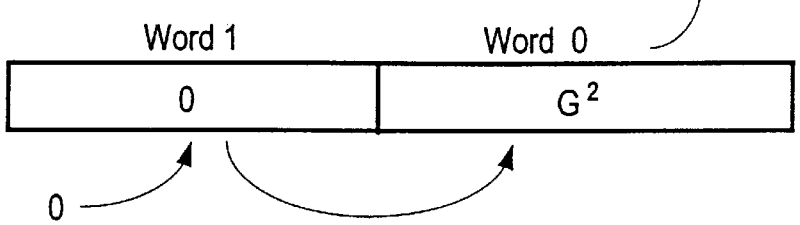
FIG. 5C
Intermediate Value
Accumulator
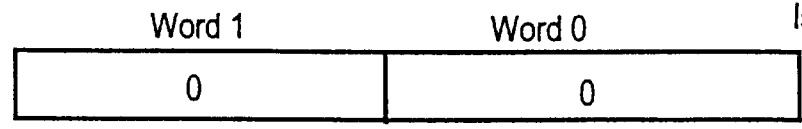
Current Size Of Intermediate Value Is 1 Word Current Size Of
Intermediate Value
Is 2 Words Current Size Of Intermediate Value Is 2 Words

FIG. 5J

Intermediate Value

| Word 1 | Word 0 |
|---|---|
| $G^4$(Upper Portion) | $G^4$(Lower Portion) |

Accumulator

| Word 1 | Word 0 |
|---|---|
| 0 | 0 |

OPTIMIZED MACHINE COMPUTATION OF EXPONENTIAL FUNCTIONS AND MODULO FUNCTIONS

FIELD OF THE INVENTION

The invention relates to cryptographic systems, and more specifically, to a public key encryption approach for providing secure communication.

BACKGROUND OF THE INVENTION

Certain computing operations are known to consume significant processor resources. Depending on the application or environment in which the processing is occurring, the computing operations may create a processing bottleneck or unacceptable processing delays. Therefore, it is desirable to make the computing operations as efficient as possible and as fast as possible.

For example, computing an exponent operation, in which a relatively large number is raised to the power of another large number, is known to be computationally intensive. At least three computationally expensive actions can occur. First, it is possible that the base number, the exponent number, and the result number will not fit into any available register of the processor, causing a condition called register overflow. When a register overflow occurs, the base number, exponent number or result number must be stored in main memory. This requires the processor to use slower, memory-based operations rather than faster, register-based operations to compute the numbers.

Second, as the result number is computed, it grows rapidly in terms of length in bytes. As a result, it is often necessary to repeatedly allocate additional memory for storage of the result, as the result grows. This requires repeated use of computationally expensive memory allocation operations.

Modulo operations are also known to be computationally expensive. A modulo value is the integer remainder that results when one number (the dividend) is evenly divided by another number (the divisor). In past approaches, processor divide instructions have been used to compute a modulo. Divide instructions are known to require several processor operations that are relatively slow. Also, in past approaches, modulo computation wastes memory and other computing resources because unnecessary values are stored and maintained, such as intermediate results of the division instructions. Further, the past approaches generally involve carrying out division operations on non-significant portions of the dividend. Thus, when used in certain applications, such as high-speed networks, they can create a bottleneck.

One context in which these problems become acute is in computing key values that are used in secure data communications. The proliferation of network computing has dramatically increased the flow of information between computers. Accompanying the increased flow of information is an increased concern for providing secure communication.

Cryptography is the art and science of keeping messages secure. A message is information or data that is arranged or formatted in a particular way. In general, a message, sometimes referred to as "plaintext" or "cleartext", is encrypted or transformed using a cipher to create "ciphertext" which disguises the message in such a way as to hide its substance. In the context of cryptography, a cipher is a mathematical function. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

There are many different encryption/decryption approaches for protecting information. Several approaches are described in "Applied Cryptography", Second Edition, by Bruce Schneier. The selection of a particular encryption/decryption approach depends upon the requirements of a particular application. Some of the considerations include the types of communications to be made more secure, the particular environment parameters in which the security is to be implemented and desired level of security. An important consideration is the particular system on which a particular security scheme is to be implemented since the level of security often has a direct effect on system resources.

For example, for small applications that require only a relatively low level of security, a traditional restricted algorithm approach may be used. With a restricted algorithm approach, a group of participants agree to use a particular algorithm to encrypt and decrypt messages exchanged between the participants. Since the algorithm is maintained in secret, a relatively simple algorithm may be used. However, if the secrecy of the algorithm is compromised, then the algorithm must be changed. Keeping the algorithm secret becomes more difficult as the number of participants increases. In addition, standard algorithms can't be used since each group of participants must have their own algorithm.

To address the shortcomings of traditional restricted algorithm approaches, many contemporary cryptography approaches use a key-based algorithm. There are generally two types of key-based algorithms: symmetric and public key. The "key" forms one input to a mathematical function used to generate a ciphertext.

Public key algorithms are designed so that the key used for encryption is different than the key used for decryption. The decryption key cannot, at least not in any reasonable amount of time, be determined from the encryption key. The encryption key (public key) is typically made public so that anyone, including an eavesdropper, can use the public key to encrypt a message. However, only a specific participant in possession of the decryption key (private key) can decrypt the message. A common extension of the basic public key encryption approach is for a group of participants to publish their public keys in a database and maintain their own private keys. Participants can simply obtain the public key of the participant to whom they want to send a message from the database and use it to encrypt a message to be sent to that participant.

Most public key algorithms are used to encrypt keys, and not messages, because they can require a relatively large amount of system resources and time to encrypt entire messages, and also because public key encryption systems are vulnerable to chosen-plaintext attacks, particularly when there are relatively few possible encrypted messages.

An increasingly popular method for establishing a secure data communication channel involves key exchange in a public key cryptosystem. Two or more parties, who wish to communicate over a secure channel, exchange or make available to each other public or non-secure key values. Each party uses the other party's public key value to privately and securely compute a private key, using an agreed-upon algorithm. The parties then use their private keys in a separate encryption algorithm that is used to encrypt messages passed over the data communication channel. The private keys are also called session keys and are used to encrypt/decrypt a specified number of messages or used to encrypt/decrypt messages for a specified period of time. A typical scenario for exchanging a message between participants A and B using a public key algorithm involves the following steps:

1. B provides a public key K to A
2. A generates a random session key SK, encrypts it using public key K and sends it to B
3. B decrypts the message using private key K' to recover the session key SK
4. Both A and B use the session key SK to encrypt their communications with each other This approach provides the added security of destroying the session key at the end of a session which provides stronger protection against eavesdroppers since each session key has a limited life.

A well known public key exchange method is the Diffie-Hellman method described in U.S. Pat. No. 4,200,770 issued on Apr. 29, 1980 and entitled "Cryptographic Apparatus and Method." According to the Diffie-Hellman method, two participants, A and B, who wish to communicate securely, each select random large numbers x and x' that are kept secret. A and B also agree (publicly) upon a base number G and a large prime number P. A and B exchange the values of G and P over a non-secure channel or publish them in a database that both can access. Then A and B each privately compute public keys Y and Y', respectively, as follows:

[1] A privately computes a public key Y as: $Y = G^x \mod P$
[2] B privately computes a public key Y' as: $Y' = G^{x'} \mod P$ A and B then exchange or publish their respective public keys Y and Y' and determine private keys Z and Z' as follows:

[3] A computes a private key Z as: $Z = Y'^x \mod P$
[4] B computes a private key Z' as: $Z' = Y^{x'} \mod P$ Thus, A's private key is a function of its own private random number (x) and the public key (Y') determined by A. As it turns out, Z is equal to Z' based upon the following:

Recall:

$Z = Y'^x \mod P$ and $Z' = Y^{x'} \mod P$

Substituting for Y and Y' using equations [1] and [2] above yields:

$Z = (G^{x'} \mod P)^x \mod P$ and $Z' = (G^x \mod P)^{x'} \mod P$ $Z = G^{x'x} \mod P$ and $Z' = G^{xx'} \mod P$ Therefore, Z=Z'

Thus, using the Diffie-Hellman protocol, A and B each possess the same secure key Z, Z' and can use it to encrypt messages to each other. An eavesdropper who intercepts an encrypted message can recover it only by knowing x or x', or by solving an extremely difficult discrete logarithm to yield x or x'. Thus, the Diffie-Hellman protocol provides a relatively secure approach.

A drawback of public key encryption approaches is that they require significant system resources and time to perform because they are computationally intensive. For example, performing the Diffie-Hellman approach requires performing both exponentiation and modulo computations which are known to require significant system resources and time. Depending on the application or environment in which the processing is occurring, the computing operations may create a processing bottleneck or unacceptable processing delays. Therefore, it is desirable to perform encryption/decryption operations as fast as possible.

Based upon the foregoing, there is a clear need for improved approaches to machine computation of values that have exponents, exponential functions, and modulo functions.

In particular, there is an acute need for an improved approach to machine computation of values that have exponents in which the approach uses as little machine memory as possible.

There is also a need for an improved approach to machine computation of values that involve modulo functions in which the approach does not use unnecessary processor divide instructions.

Further, there is a need for such approaches that avoid wasting machine operations or instructions on manipulating insignificant intermediate information that is created as part of the machine computation.

There is also a need for such approaches that prevent register overflow as an exponentiated value grows larger during the computation operations.

There is also a need for such approaches that minimize the number of memory allocation operations that are carried out during the approach.

Based on the need to provide secure communication while limiting the adverse effects on system resources and the limitations in the prior approaches, an approach for providing secure communication that provides a relatively high level of security while requiring relatively fewer system resources and time to perform is highly desirable.

SUMMARY OF THE INVENTION

According to one aspect of the invention, a method is provided for machine computation of an exponential value $G^x$, wherein G and x are integers. The method comprises the steps of determining a maximum possible size of an intermediate value to be used to determine the value of $G^x$, allocating intermediate memory to store the intermediate value of the maximum possible size, initializing the intermediate memory to the value of G as expressed by the maximum possible size, and determining the value of $G^x$ in the intermediate memory by performing iterative multiplication operations on portions of the intermediate value.

According to another aspect of the invention, a method for securely exchanging a public encryption key between a first location and a second location is provided, wherein the public encryption key is associated with the first location and is defined by the equation $Y = G^x \mod P$ and wherein G and x are integers and P is a prime number. The method comprises the steps of determining a maximum possible size of an intermediate value used to determine the value of $G^x$, allocating intermediate memory to store the intermediate value of the maximum possible size, and determining the value of $G^x$ in the intermediate memory by performing iterative multiplication operations on portions of the intermediate value.

According to another aspect of the invention, a computer system for determining machine computation of an exponential value $G^x$ is provided, wherein G and x are integers. The computer system comprises one or more processors and a memory communicatively coupled to the one or more processors, wherein the memory includes one or more sequences of instructions which, when executed by the one or more processors, cause the one or more processors to perform the steps of determining a maximum possible size of an intermediate value to be used to determine the value of $G^x$, allocating intermediate memory to store the intermediate value of the maximum possible size, initializing the intermediate memory to the value of G as expressed by the maximum possible size and determining the value of $G^x$ in the intermediate memory by performing iterative multiplication operations on portions of the intermediate value.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3 is a flow chart illustrating a method for determining a public or private encryption key.

FIG. 5A is a block diagram illustrating the contents of INTERMEDIATE VALUE and ACCUMULATOR during the method illustrated in FIGS. 4A and 4B;

FIG. 5B is a block diagram illustrating the contents of INTERMEDIATE VALUE and ACCUMULATOR during another step of the method illustrated in FIGS. 4A and 4B;

FIG. 5C is a block diagram illustrating the contents of INTERMEDIATE VALUE and ACCUMULATOR during another step of the method illustrated in FIGS. 4A and 4B;

FIG. 5J is a block diagram illustrating the contents of INTERMEDIATE VALUE and ACCUMULATOR during another step of the method illustrated in FIGS. 4A and 4B;

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

OVERVIEW

Approaches for optimized machine computations are provided. In one aspect, an optimized approach for machine computation of exponential functions is provided. In another aspect, an optimized approach for machine computation of modulo functions is provided. The approaches involve operations that significantly decrease the amount of system resources and time that are needed to compute the functions by machine.

In one application of the foregoing approaches, a public key exchange encryption approach for securely exchanging data between participants is provided. The term "participant" as used herein is analogous to a user, a location or a node. According to this approach, public keys are determined using secret encryption data known only by the participants. The public keys are made available to the participants. Private keys are determined using the public keys and the secret encryption data. The private keys are used by the participants to encrypt and decrypt data exchanged between participants.

The determination of the public and private keys is performed using a "Big Multiply" approach and a "Big Mod" approach described herein, which significantly reduce the amount of system resources and time required to determine encryption keys.

The operative mechanism responsible for the significant reduction in the amount of system resources and time required to generate keys is the approach of determining the maximum size of an intermediate value required to determine an encryption key, and allocating memory sufficiently large to store the maximum size intermediate value, so that no additional memory allocation operations are required during the determination of the encryption keys. In addition, iterative multiplication and shift operations are performed on portions of the intermediate value in a cascade fashion to prevent spilling of the intermediate value.

Hence, the public key exchange encryption approach described herein provides secure communication between participants while requiring relatively fewer system resources and time. In addition, the approach does not require a restricted algorithm or require participants to exchange private keys or requiring that participants agree to or exchange any other information that must be kept secret to maintain secure communication.

SYSTEM OVERVIEW

Figure 1:
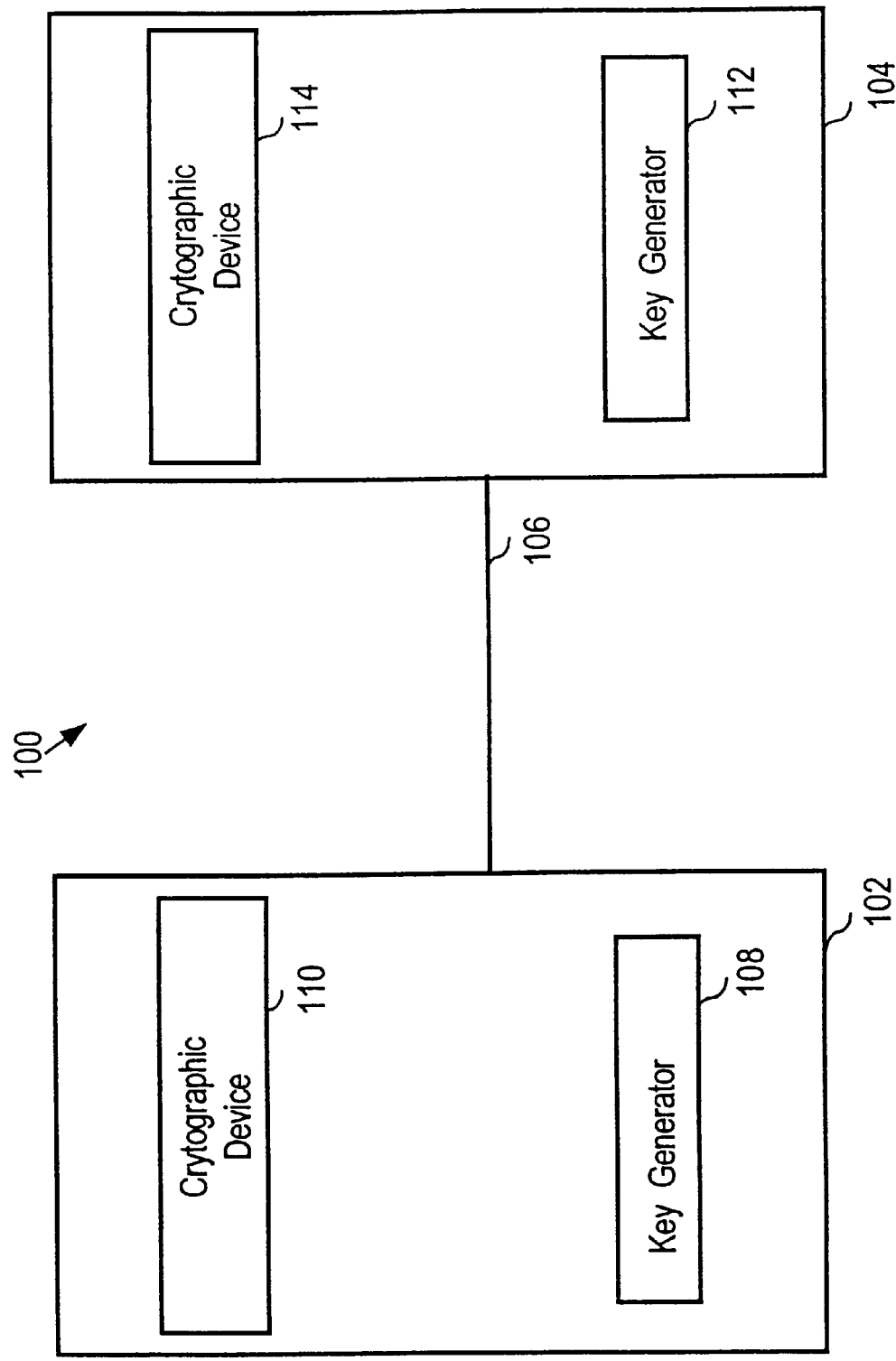
FIG. 1 is a block diagram of a system for providing secure communication between participants.

FIG. 1 illustrates a system 100 for providing secure communication between participants according to an embodiment. A location 102 communicates with a location 104 by a link 106. Link 106 provides for the exchange of information between participants 102 and 104. Examples of link 106 include, but are not limited to, a local area network (LAN), a wide area network (WAN), the global packet-switched network known as the Internet, a wireless transmission medium, or any other medium for exchanging information between participants 102 and 104. Link 106 may be non-secure, thereby allowing third party access to information transmitted by the link 106, or alternatively, link 106 may be secure.

Location 102 includes a key generator 108 and a cryptographic device 110. Key generator 108 generates public and private keys used for encrypting and decrypting information exchanged with location 104. Cryptographic device 110 encrypts and decrypts information exchanged with location 104 using private and public keys generated by key generator 108.

Location 104 includes a key generator 112 and a cryptographic device 114. Key generator 112 generates public and private keys used for encrypting and decrypting information exchanged with location 102. Cryptographic device 114 encrypts and decrypts information exchanged with location 102 using private and public keys generated by key generator 112.

Using this approach, participants 102 and 104 can securely exchange information over link 106 using a public key exchange approach. In this application, the term "securely" means that an eavesdropper, having access to encrypted information transmitted on link 106, cannot feasibly decrypt the encrypted information. When the number of operations required to decrypt encrypted information is sufficiently large, the function used to encrypt the information is generally considered to be a one-way function and the encrypted information infeasible to decrypt because of the extraordinary amount of time and resources that would be required to decrypt the encrypted message.

Participants 102 and 104 each determine a public key based upon secret data known only to each of them. The public keys are then made available to the other participants 102 and 104. Then each participant determines a private key based upon the secret data known only to each of them and the previously determined public keys. However, the secret data known by participants 102 and 104 does not need to be agreed upon or known by any other participants.

Participants 102 and 104 each select random large numbers x and x' respectively, that are kept secret from each other and from other participants. Participants 102 and 104 select both a base number G and a large prime number P. G and P may be previously selected and publicly exchanged or stored on a database accessible to both participants 102 and 104. For added security, G and P may be periodically changed, for example on a session basis. Participants 102 and 104 then each privately determine public keys Y and Y' as follows:

[1] Location 102 privately determines a public key Y as: $Y = G^x \mod P$

[2] Location 104 privately computes a public key Y' as: $Y' = G^{x'} \mod P$ Participants 102 and 104 make their respective public keys Y and Y' available to each other. For example, public keys Y and Y' may be exchanged or stored in a database for mutual access.

Participants 102 and 104 each then privately determine private keys Z and Z' as follows:

[3] Location 102 privately determines private key Z as: $Z = Y'^x \mod P$

[4] Location 104 privately determines private key Z' as: $Z' = Y^{x'} \mod P$ Thus, participants 102 and 104 each possess a secure private key Z and Z' respectively, that are used to encrypt and decrypt data exchanged between participants 102 and 104. Z is equal to $Z^1$ based upon the following:

Recall:

$Z = Y'^x \mod P$ and $Z' = Y^{x'} \mod P$

Substituting for Y and Y' using equations [1] and [2] above yields:

$Z = (G^{x'} \mod P)^x \mod P$ and $Z' = (G^x \mod P)^{x'} \mod P$ $Z = G^{x'x} \mod P$ and $Z' = G^{xx'} \mod P$ Therefore, Z=Z'

An eavesdropper who intercepts an encrypted message on link 106 and knows Y and Y', can recover the decrypted message only by knowing x or x', or by solving an extremely difficult discrete logarithm to yield x or x'.

Figure 2:
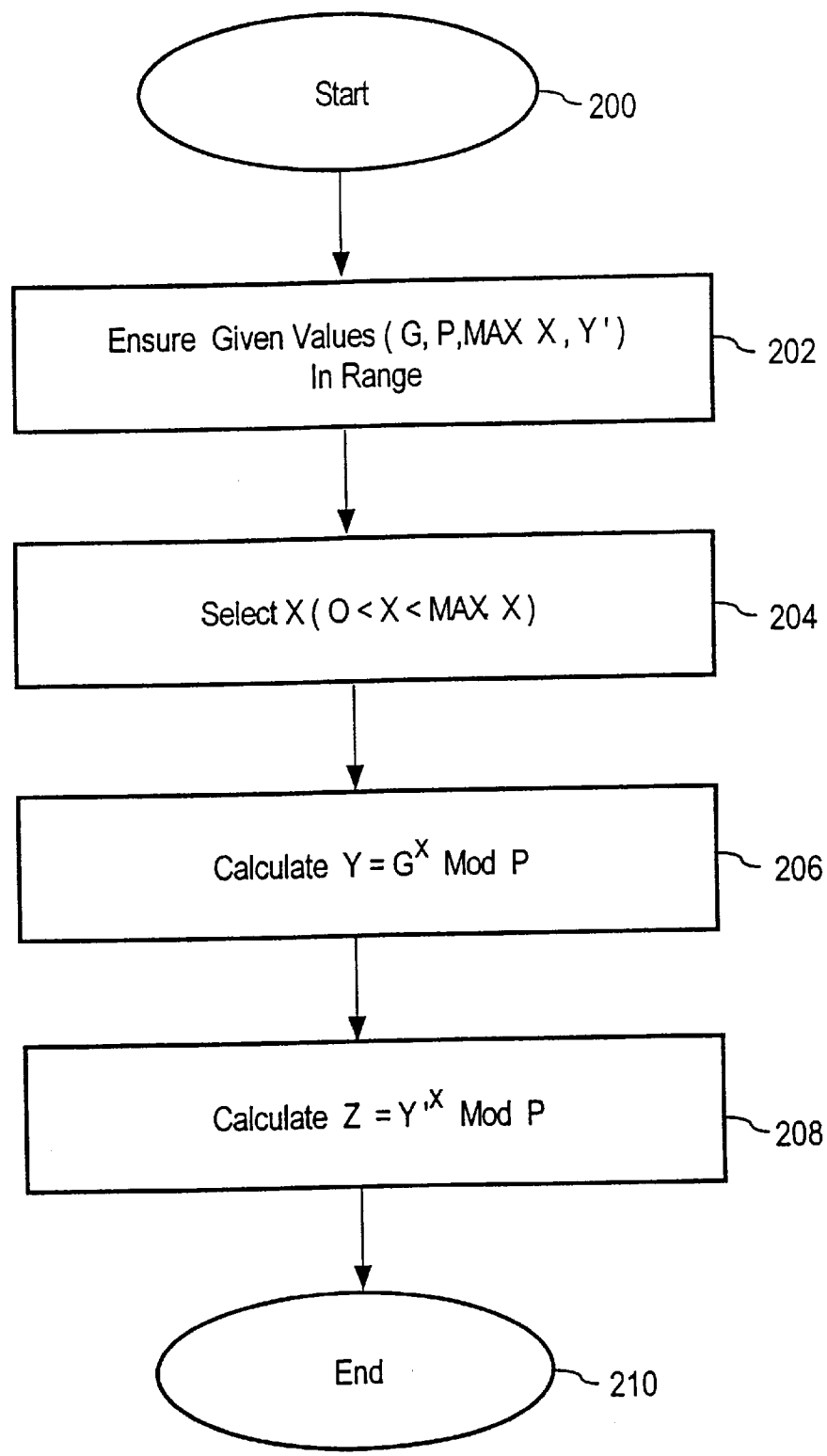
FIG. 2 is a flow chart illustrating a method for providing secure communication between participants.

FIG. 2 is a flow chart that illustrates a method for determining public key Y and private key Z for location 102. Although the steps are illustrated and described in the context of determining public key Y and private key Z for location 102, similar steps may be used for machine computation of functions in any other context.

After starting in step 200, in step 202, the values for G, P, a maximum value for x(MAX X) and Y' are checked to ensure that they are in a valid range. For example, the values of G, P, MAX X, and Y' all must be non-zero. Other optional validity checks may be undertaken in step 202, depending upon the desired security level and robustness of the system. For example, in step 202 the values of G and P are checked to ensure that each has greater than a pre-determined minimum number of bits or digits. As another example, P is checked to ensure that it falls within a specialized class of prime numbers such as Mersenne primes or that G is a primitive root modulo P.

In step 204, random large number x is selected in the range between 0 and MAX X. In step 206, the value of Y is determined by: $Y = G^x \mod P$ as previously described. In step 208, the value of Z is determined by: $Z = Y'^x \mod P$ as previously described. The process is complete in step 210.

FIG. 3 illustrates a method for determining a value for public key Y, where $Y = G^x \mod P$. Accordingly, the method of FIG. 3 may be used at step 206 of FIG. 2. After starting in step 300, in step 302 two operations are performed. First, a maximum word size of an intermediate value is determined as follows:

MAX SIZE OF INTERMEDIATE VALUE=(((number of significant bits in G)*x) plus (word size*8−1))/(word size*8)

Second, the current size of an intermediate value is set to 1.

In step 304, a validity check is made to ensure that the value of MAX SIZE OF INTERMEDIATE VALUE is greater than or equal to 1. In step 306, an amount of machine memory equal, in words, to the value of MAX SIZE OF INTERMEDIATE VALUE is allocated to store the intermediate value.

In step 308, a check is made to ensure that x is non-trivial. The reason for the check of step 308 is that if x is a value such as a 0 or a 1, then determining $G^x$ is trivial.

In step 310, the intermediate value is initialized with G and unused words are padded with leading zeros. In step 312, $G^x$ is determined using a "Big Multiply" approach described in more detail hereinafter, such that $G^x$ is expressed by the intermediate value and the current size of the intermediate value.

In step 314, the modulus of the intermediate value and the value of P (Intermediate Value mod P) is determined using the current size of the intermediate value and a "Big Mod" technique according to an embodiment which is described in more detail hereinafter. In step 316, the process for determining the value of $Y = G^x \mod P$ is complete.

"BIG MULTIPLY" APPROACH

In general, determining the value of $G^x$ using the "Big Multiply" approach involves allocating sufficient memory in a single allocation, and using iterative multiplication operations, so that the value of $G^x$ may be determined in the allocated memory. This reduces the number of memory-to-memory operations and the amount of system resources and time that are required to determine the value of $G^x$. In addition, the amount of memory used while determining the value of $G^x$ is tracked so that only the memory locations containing meaningful intermediate values of $G^x$ are operated on.

Figure 4A:
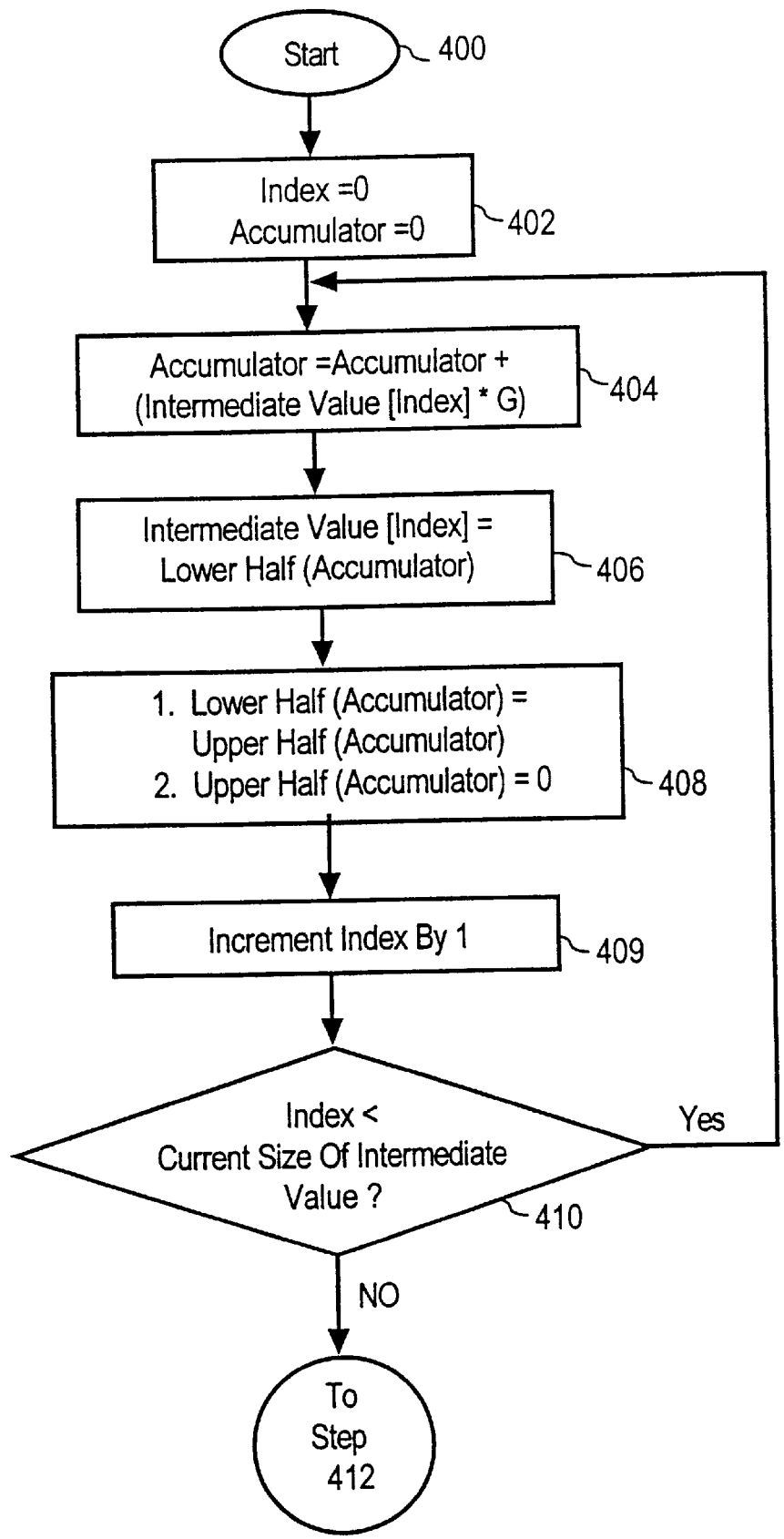
FIG. 4A is a flow chart illustrating a portion of a method for performing a "Big Multiply" operation.
Figure 4B:
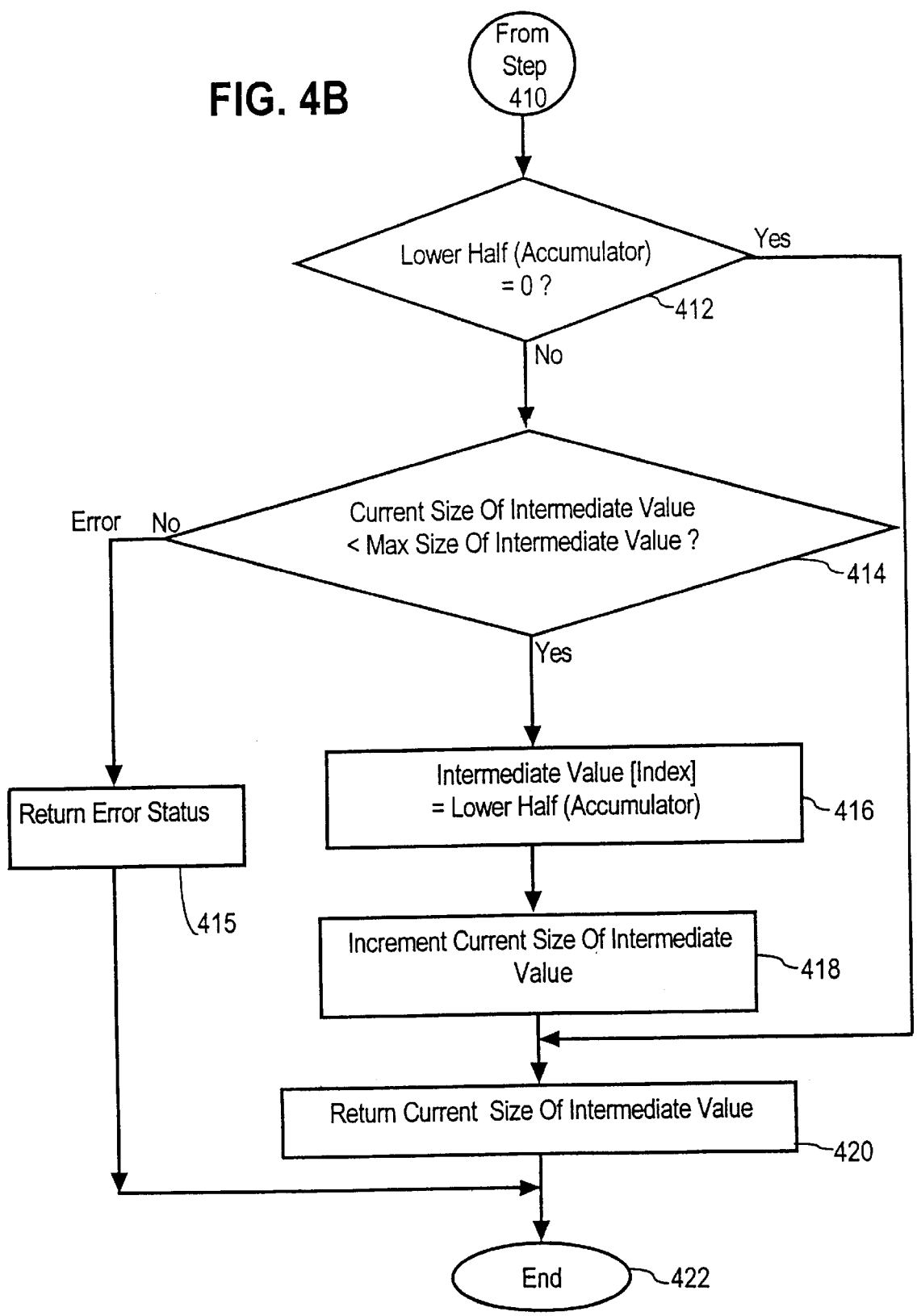
FIG. 4B is a flow chart illustrating another portion of a method for performing a "Big Multiply" operation.

An example of determining $G^x$ using the "Big Multiply" approach according to an embodiment is now described with reference to the flow chart of FIGS. 3, 4A and 4B and the block diagrams of FIGS. 5A through 5J. In this example, x=4 and a value of G is selected such that $G^2$ requires 1 word (2 bytes or 16 bits) of memory and $G^4$ requires 2 words (4 bytes or 32 bits) of memory. An example value for G that meets these criteria is "225".

Starting with values for x=4 and G=225, the maximum size in words of the intermediate value, as determined in step 302, is as follows:

(((# of significant bits in G)*x)+(word size*8−1))/(word size*8)

Substituting the values for x, G and a word size of 2 bytes yields:

((8*4)+((2*8)−1))/(2*8)=(32+15)/16=47/16=2.9375

Therefore, the determination of $G^x$ according to an embodiment will require a intermediate value having a maximum size of 2 words. Accordingly, 2 words of memory are allocated for storing the intermediate value. Embodiments are described herein in the context of words and not bytes because the approaches described herein are independent of a particular word size or byte ordering. In the present example, the word size is two bytes.

FIG. 5A illustrates an intermediate value (INTERMEDIATE VALUE) having two words, identified as WORD0 and WORD1. In addition, another memory location of the same size as INTERMEDIATE VALUE (2 words) is allocated. This location is designated in FIG. 5A as ACCUMULATOR and has a size of 2 words, identified as WORD0 and WORD1.

In step 310, INTERMEDIATE VALUE is initialized with the value of G. Since G=225, requiring 8 bits, the value of G is stored in WORD0 of INTERMEDIATE VALUE and WORD1 is initialized to 0. Referring to step 402 of FIG. 4A, INDEX=0 and ACCUMULATOR=0. Thus, FIG. 5A illustrates the state of INTERMEDIATE VALUE and ACCUMULATOR as of step 402.

As illustrated in FIG. 5B and step 404, the value of (INTERMEDIATE VALUE[INDEX] *G) is added to ACCUMULATOR. Since INDEX=0, INTERMEDIATE VALUE[INDEX]=the contents of WORD0 which is G. Therefore, (G*G) or $G^2$ is loaded into ACCUMULATOR. Since $G^2$ only requires 1 word of space, WORD1 of ACCUMULATOR is still 0.

In step 406, the lower half (WORD0) of ACCUMULATOR is loaded into INTERMEDIATE VALUE[INDEX]. As illustrated in FIG. 5B, since INDEX=0, INTERMEDIATE VALUE[INDEX] is WORD0 of INTERMEDIATE VALUE. Thus, WORD0 of ACCUMULATOR is loaded into WORD0 of INTERMEDIATE VALUE. Since $G^2$ only requires 1 word of space, the current size of INTERMEDIATE VALUE is 1 word.

In step 408, two operations are performed. First, the value contained in the upper half (WORD1) of ACCUMULATOR is loaded into the lower half (WORD0) of ACCUMULA-TOR. Second, 0 is loaded into the upper half (WORD1) of ACCUMULATOR. As illustrated in FIGS. 5B and 5C, since WORD1 of ACCUMULATOR was 0, both WORD1 and WORD0 of ACCUMULATOR are now 0.

In step 409, INDEX is incremented by 1, to a value of 1. In step 410 a determination is made as to whether INDEX is less than the current size of INTERMEDIATE VALUE. Since INDEX=1 and the current size of the INTERMEDI-ATE VALUE is 1 word, control proceeds to step 412 where a determination is made as to whether the value contained in the lower half (WORD0) of ACCUMULATOR=0. If not, then an overflow condition exists, and in step 414, a determination is made whether the current size of the intermediate value is less than the maximum size of the intermediate value. If not, then in step 415 an error status reflecting the error that occurred is returned and control proceeds to step 422 where the process is aborted.

On the other hand, if in step 414 a determination is made that the current size of INTERMEDIATE VALUE is less than the maximum size of INTERMEDIATE VALUE, then in step 416 the lower half (WORD0) of ACCUMULATOR is loaded into WORD0 of INTERMEDIATE VALUE. In step 418, the current size is incremented by 1. In step 420 the current size of the intermediate value is returned.

If in step 412 a determination is made that the value contained in the lower half (WORD0) of ACCUMULATOR=0, then control proceeds to step 420 where the current size of the intermediate value is returned.

The first pass through the "Big Multiply" routine determines the value of $G^2$. The steps illustrated in FIGS. 4A and 4B are repeated using the values retained in INTERMEDI-ATE VALUE and ACCUMULATOR to determine $G^3$.

Figure 5D:
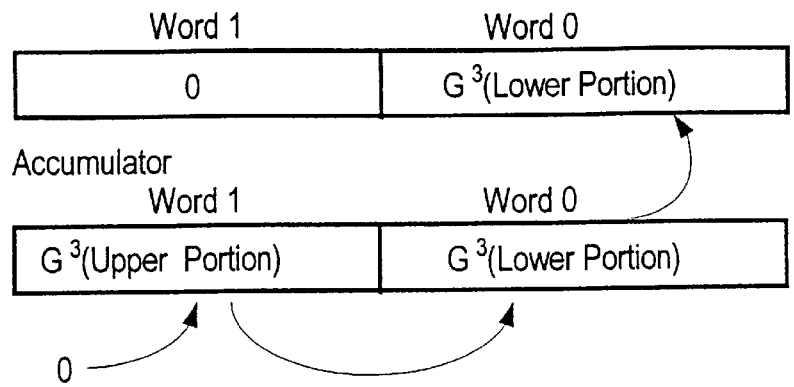
FIG. 5D is a block diagram illustrating the contents of INTERMEDIATE VALUE and ACCUMULATOR during another step of the method illustrated in FIGS. 4A and 4B.

After starting in step 400, in step 402, both INDEX and ACCUMULATOR are set to 0. In step 404, the value of (INTERMEDIATE VALUE[INDEX] *G) is added to ACCUMULATOR. Since INDEX=0, INTERMEDIATE VALUE[INDEX] refers to the contents of WORD0 of INTERMEDIATE VALUE, which contains $G^2$. Therefore, ($G^2$*G) or $G^3$ is loaded into ACCUMULATOR. Since $G^3$ requires 3 bytes, both WORD0 and WORD1 are used to hold $G^3$. As illustrated in FIG. 5D, the lower portion of $G^3$ is stored in WORD0 and the upper portion of $G^3$ is stored in WORD1.

In step 406, the contents of the lower half (WORD0) of ACCUMULATOR is loaded into INTERMEDIATE VALUE[INDEX]. As illustrated in FIG. 5D, since INDEX= 0, the contents of the lower half (WORD0) of ACCUMU-LATOR are loaded into WORD0 of INTERMEDIATE VALUE. Thus, the lower portion of G3 is loaded into WORD0 of INTERMEDIATE VALUE.

Figure 5E:
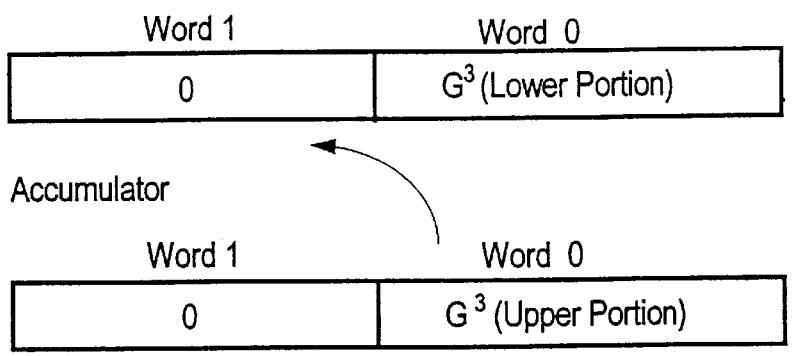
FIG. 5E is a block diagram illustrating the contents of INTERMEDIATE VALUE and ACCUMULATOR during another step of the method illustrated in FIGS. 4A and 4B.

In step 408, two operations are again performed. First, the value contained in the upper half (WORD1) of ACCUMU-LATOR is loaded into the lower half (WORD0) of ACCU-MULATOR. Second, 0 is loaded into the upper half (WORD1) of ACCUMULATOR. As illustrated in FIGS. 5D and 5E, these operations cause the upper portion of $G^3$ to be loaded into WORD0 of ACCUMULATOR and 0 to be loaded into WORD1 of ACCUMULATOR.

In step 409, INDEX is incremented by 1, to a value of 1. In step 410 a determination is made as to whether INDEX is less than the current size of INTERMEDIATE VALUE. Since INDEX=1 and the current size of the INTERMEDI-ATE VALUE is 2 words, control returns to step 404 where the value of (INTERMEDIATE VALUE[INDEX] *G) is added to ACCUMULATOR. Since INDEX=1, INTERME-DIATE VALUE[INDEX] refers to the contents of WORD1 of INTERMEDIATE VALUE, which contains 0. Therefore, the contents of ACCUMULATOR remain the same as illustrated in FIG. 5E.

Figure 5F:
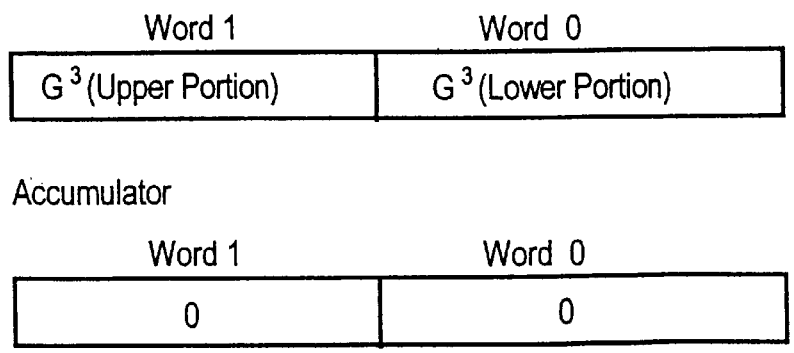
FIG. 5F is a block diagram illustrating the contents of INTERMEDIATE VALUE and ACCUMULATOR during another step of the method illustrated in FIGS. 4A and 4B.

In step 406, the contents of the lower half (WORD0) of ACCUMULATOR is loaded into INTERMEDIATE VALUE[INDEX]. As illustrated in FIG. 5E, since INDEX=1, the upper portion of $G^3$ is loaded into WORD1 of INTERMEDIATE VALUE. Thus, as illustrated in FIG. 5F, the lower portion of $G^3$ is contained in WORD0 of INTERMEDIATE VALUE and the upper portion of $G^3$ is contained in WORD1 of INTERMEDIATE VALUE.

In step 408, two operations are again performed. First, the value contained in the upper half (WORD1) of ACCUMULATOR is loaded into the lower half (WORD0) of ACCUMULATOR. Second, 0 is loaded into the upper half (WORD1) of ACCUMULATOR. As illustrated in FIG. 5F, these operations cause the upper a 0 to be loaded into both WORD0 and WORD1 of ACCUMULATOR.

In step 409, INDEX is incremented by 1, to a value of 2. In step 410 a determination is made as to whether INDEX is less than the current size of INTERMEDIATE VALUE. Since INDEX=2 and the current size of the INTERMEDIATE VALUE is 2 words, control proceeds to step 412 where a determination is made as to whether the value contained in the lower half (WORD0) of ACCUMULATOR=0. Since it does, the current size of the intermediate value (2) is returned and the process completed in step 422.

The second pass through the "Big Multiply" routine determined the value of $G^3$. The steps illustrated in FIGS. 4A and 4B are repeated using the values retained in INTERMEDIATE VALUE and ACCUMULATOR to determine $G^4$.

Figure 5G:
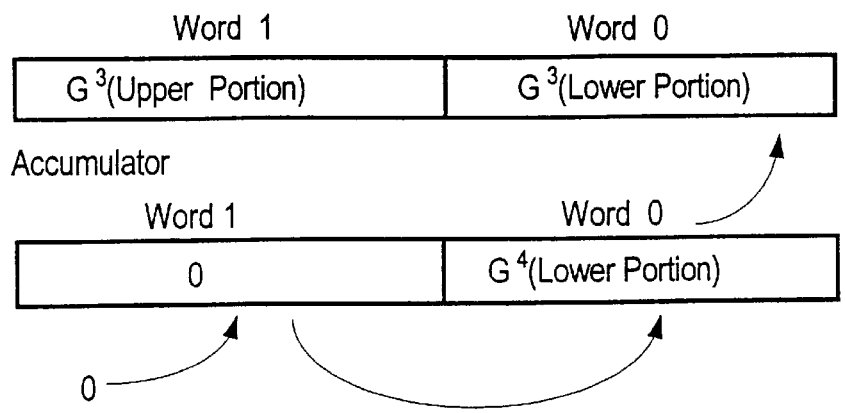
FIG. 5G is a block diagram illustrating the contents of INTERMEDIATE VALUE and ACCUMULATOR during another step of the method illustrated in FIGS. 4A and 4B.

After starting in step 400, in step 402, both INDEX and ACCUMULATOR are set to 0. In step 404, the value of (INTERMEDIATE VALUE[INDEX] *G) is added to ACCUMULATOR. Since INDEX=0, INTERMEDIATE VALUE[INDEX] refers to the contents of WORD0 of INTERMEDIATE VALUE, which contains the lower portion of $G^3$. Therefore, the lower portion of $G^4$ is loaded into ACCUMULATOR. As illustrated in FIG. 5G, the lower portion of $G^4$ is stored in WORD0 of ACCUMULATOR.

Figure 5H:
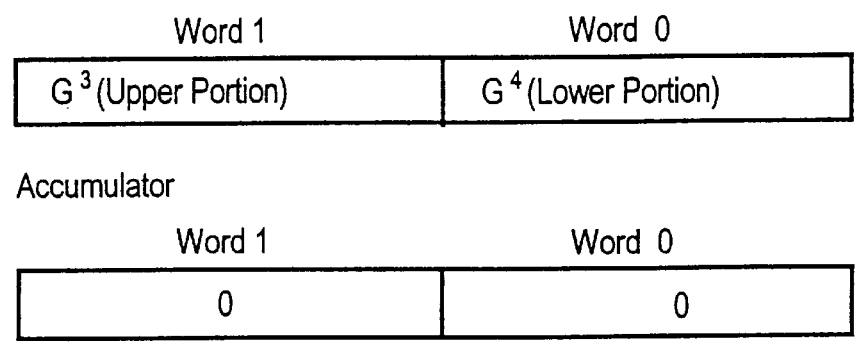
FIG. 5H is a block diagram illustrating the contents of INTERMEDIATE VALUE and ACCUMULATOR during another step of the method illustrated in FIGS. 4A and 4B.

In step 406, the contents of the lower half (WORD0) of ACCUMULATOR is loaded into INTERMEDIATE VALUE[INDEX]. As illustrated in FIGS. 5G and 5H, since INDEX=0, the contents of the lower half (WORD0) of ACCUMULATOR are loaded into WORD0 of INTERMEDIATE VALUE. Thus, the lower portion of $G^4$ is loaded into WORD0 of INTERMEDIATE VALUE.

In step 408, two operations are again performed. First, the value contained in the upper half (WORD1) of ACCUMULATOR is loaded into the lower half (WORD0) of ACCUMULATOR. Second, 0 is loaded into the upper half (WORD1) of ACCUMULATOR. As illustrated in FIGS. 5G and 5H, these operations cause a 0 to be loaded into both WORD0 and WORD1 of ACCUMULATOR.

Figure 5I:
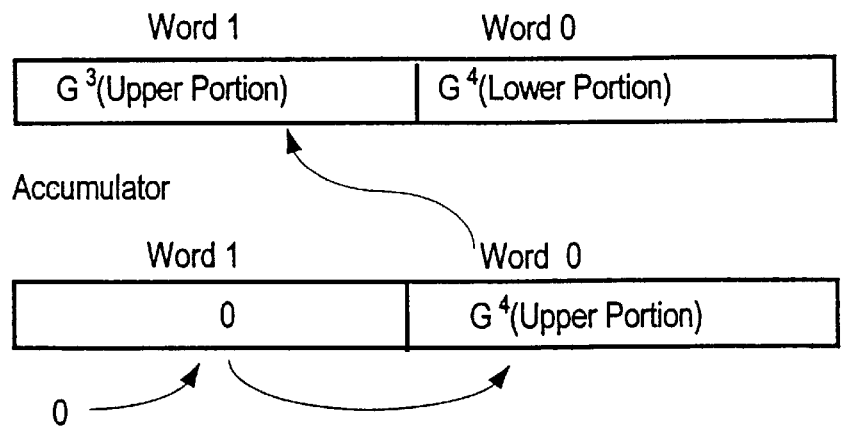
FIG. 5I is a block diagram illustrating the contents of INTERMEDIATE VALUE and ACCUMULATOR during another step of the method illustrated in FIGS. 4A and 4B.

In step 409, INDEX is incremented by 1, to a value of 1. In step 410 a determination is made as to whether INDEX is less than the current size of INTERMEDIATE VALUE. Since INDEX=1 and the current size of the INTERMEDIATE VALUE is 2 words, control returns to step 404 where the value of (INTERMEDIATE VALUE[INDEX] *G) is added to ACCUMULATOR. As illustrated in FIG. 5I, since INDEX=1, INTERMEDIATE VALUE[INDEX] refers to the contents of WORD1 of INTERMEDIATE VALUE, which contains the upper portion of $G^3$. Therefore, the upper portion of $G^4$ is loaded into WORD0 of ACCUMULATOR.

In step 406, the contents of the lower half (WORD0) of ACCUMULATOR is loaded into INTERMEDIATE VALUE[INDEX]. As illustrated in FIG. 5I, since INDEX=1, the upper portion of $G^4$ contained in WORD0 of ACCUMULATOR is loaded into WORD1 of INTERMEDIATE VALUE. Thus, as illustrated in FIG. 5J, WORD0 of INTERMEDIATE VALUE contains the lower portion of $G^4$ and WORD1 of INTERMEDIATE VALUE contains the upper portion of $G^4$.

In step 408, two operations are again performed. First, the value contained in the upper half (WORD1) of ACCUMULATOR is loaded into the lower half (WORD0) of ACCUMULATOR. Second, 0 is loaded into the upper half (WORD1) of ACCUMULATOR. As illustrated in FIG. 5I, these operations cause a 0 to be loaded into both WORD0 and WORD1 of ACCUMULATOR.

In step 409, INDEX is incremented by 1, to a value of 2. In step 410 a determination is made as to whether INDEX is less than the current size of INTERMEDIATE VALUE. Since INDEX=2 and the current size of the INTERMEDIATE VALUE is 2 words, control proceeds to step 412 where a determination is made as to whether the value contained in the lower half (WORD0) of ACCUMULATOR=0. Since it does, the current size of the intermediate value (2) is returned and the process completed in step 422.

Thus, in this example, the "Big Multiply" approach has been successfully used to determine $G^x$ where G=225 and x=4, without requiring any additional memory to be allocated beyond the original 2 words allocated for INTERMEDIATE VALUE. Using the "Big Multiply" approach, machine computation of values that are raised to an exponent, and exponential functions, is significantly more efficient and faster than in prior approaches. In particular, the "Big Multiply" approach minimizes the number of memory allocation operations that are carried out during the approach so that generally only one memory allocation operation is needed.

"BIG MOD" APPROACH

The "Big Mod" approach for determining the result of a modulo operation uses a cascade with feedback to shift the modulo result of one operation in the accumulator, so that the modulo result is merged with the next portion of the intermediate value to form the basis of the next modulo operation. In this approach, machine computation operations are carried out only on that part of the intermediate result that is numerically significant. In particular, portions of the intermediate result that have a zero value are ignored. Further, in the "Big Mod" approach, use of computationally intensive processor divide instructions is minimized and the quotient is neither allocated nor written, providing a distinct advantage over prior approaches.

The "Big Mod" approach for determining the modulo result of a number is described with reference to the flow chart of FIG. 6 and the block diagrams of FIGS. 7A–7E. Referring to FIG. 7A, the contents of INTERMEDIATE VALUE and ACCUMULATOR are the same as they were at the end of the "Big Multiply" approach as illustrated in FIG. 5J. In addition, the current size (CUR SIZE) of INTERMEDIATE VALUE is 2 words.

Figure 6:
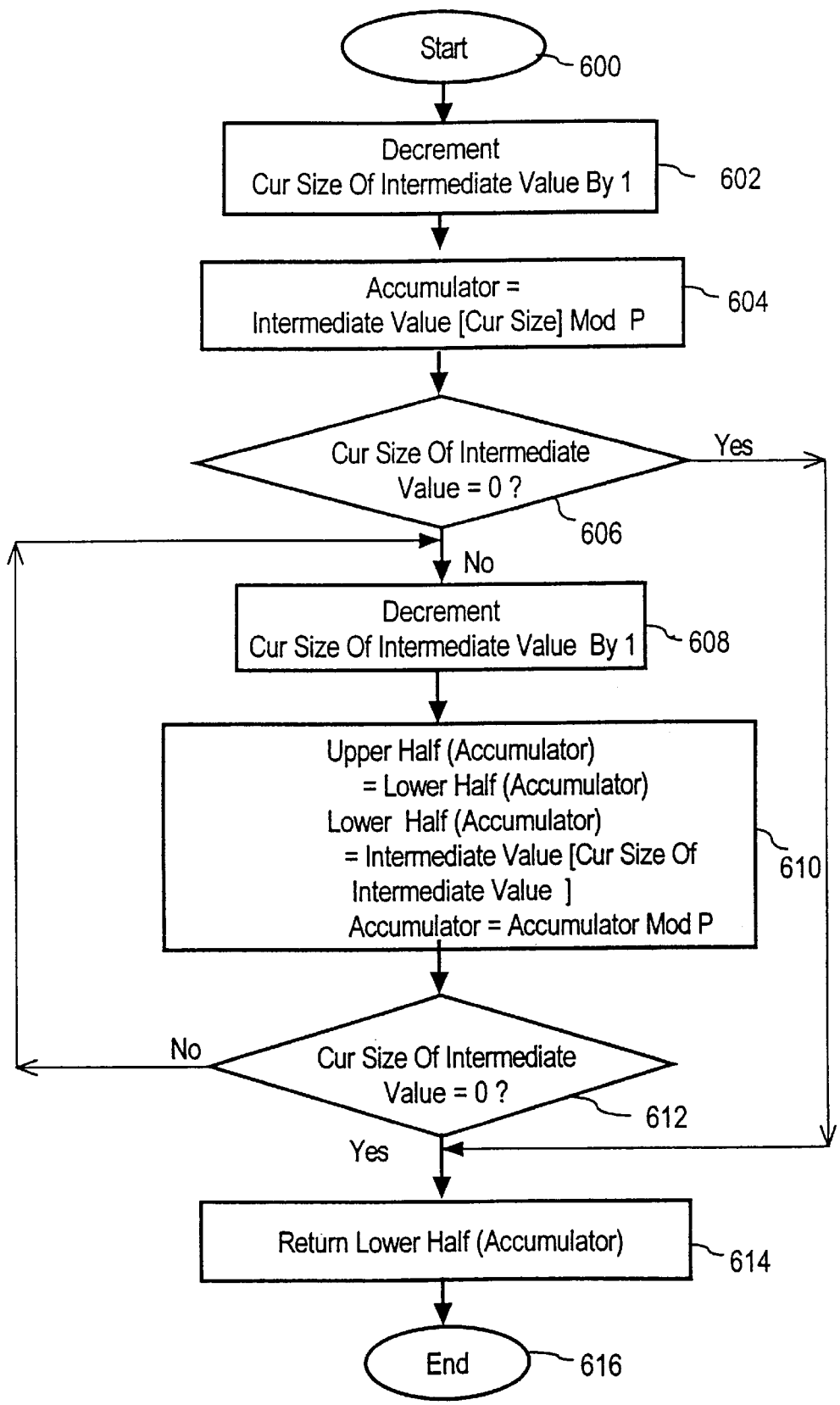
FIG. 6 is a flow chart illustrating a method for performing a "Big Mod" operation.
Figure 7A:
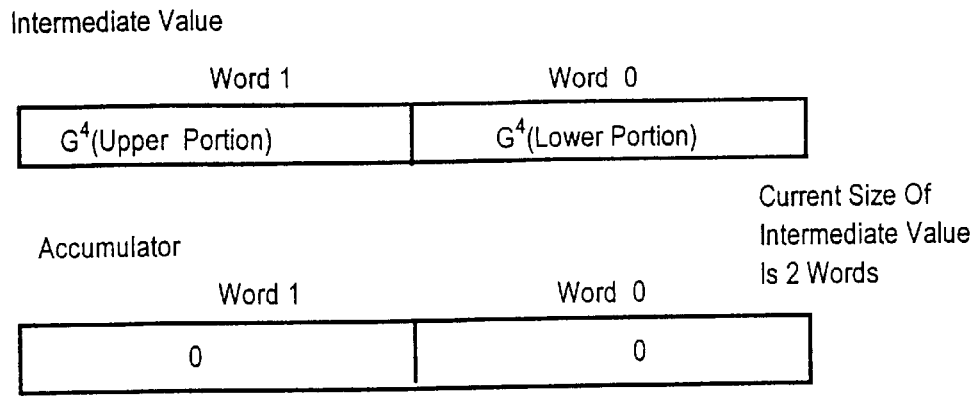
FIGS. 7A–7E is a block diagram illustrating the contents of INTERMEDIATE VALUE and ACCUMULATOR during a "Big Mod" operation.
Figure 7B:
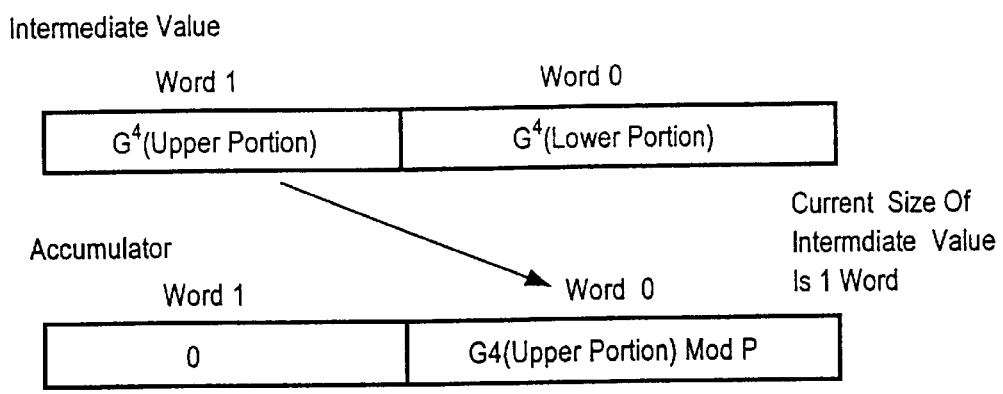

Referring to FIG. 6, after starting in step 600, in step 602 the current size (CUR SIZE) of INTERMEDIATE VALUE is decremented by 1, from 2 to 1. In step 604, the modulo of the value contained in INTERMEDIATE VALUE[CUR SIZE] and P is loaded into ACCUMULATOR. Since CUR SIZE is 1, the modulo of the value contained in WORD1 of INTERMEDIATE VALUE and P is loaded into WORD0 of ACCUMULATOR. As illustrated in FIG. 7B, the value of ($G^4$ (Upper Portion) Mod P) is loaded into WORD0 of ACCUMULATOR.

In step 606 a determination is made whether the current size (CUR SIZE) of the INTERMEDIATE VALUE=0. If so, then control proceeds to step 614 and the value contained in the lower half (WORD0) of ACCUMULATOR is returned as the result of the "Big Mod" approach.

Figure 7C:
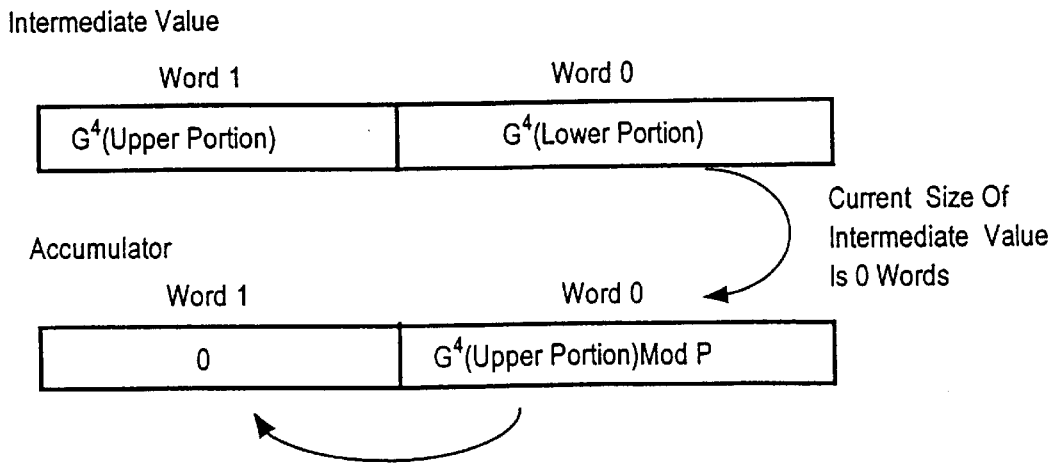
Figure 7D:
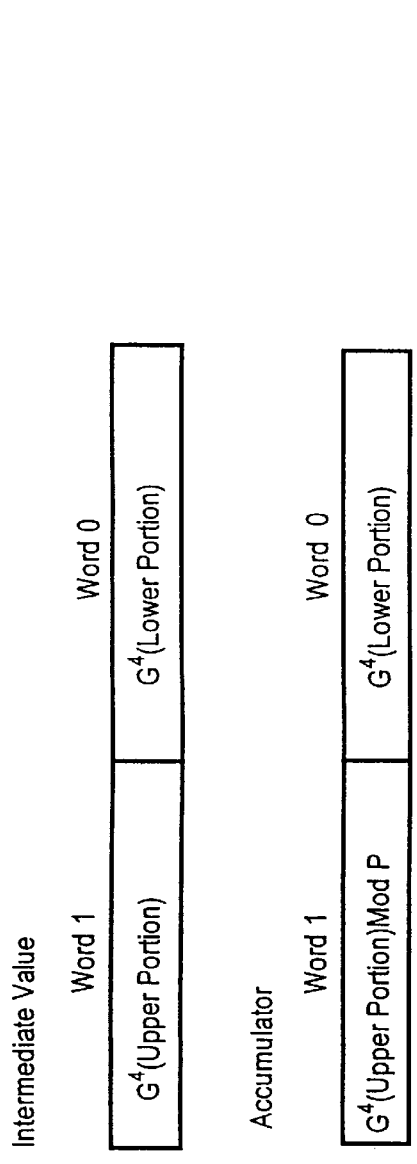
Figure 7E:
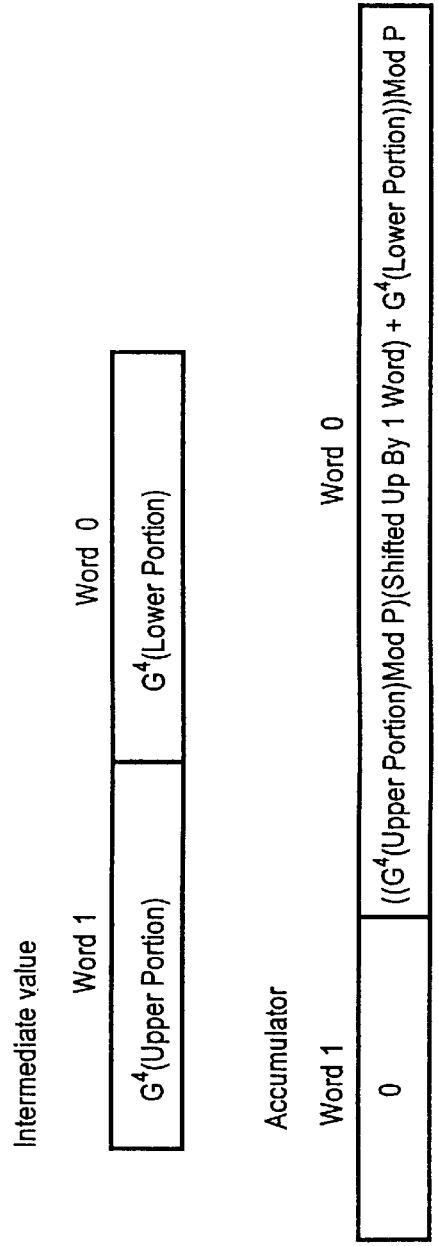

However, in the present example, since CUR SIZE=1, control continues to step 608 where CUR SIZE is decremented from 1 to 0. In step 610, three operations are performed as illustrated in FIGS. 7C and 7D. First, the value contained in the lower half (WORD0) of ACCUMULATOR is loaded into the upper half (WORD1) of ACCUMULATOR. Thus, the value of ($G^4$ (Upper Portion) Mod P) is loaded into WORD1 of ACCUMULATOR. Second, the value contained in INTERMEDIATE VALUE[CUR SIZE] is loaded into the lower half (WORD0) of ACCUMULATOR. Thus, the value of $G^4$ (Lower Portion) is loaded into WORD0 of ACCUMULATOR. Third, as illustrated in FIG. 7E, ACCUMULATOR is loaded with the value of ACCUMULATOR Mod P. Thus, WORD1 of ACCUMULATOR contains the value "0" and WORD0 of ACCUMULATOR contains the value (($G^4$ (Upper Portion) (shifted up by 1 word) and $G^4$ (Lower Portion)) Mod P.

In step 612, a determination is made whether CUR SIZE=0. If so, then control proceeds to step 614 where the value contained in the lower half (WORD0) of ACCUMULATOR is returned as the result of the "Big Mod". If not, then steps 608–612 are repeated until CUR SIZE=0. Steps 608–612 repeatedly shift the result from a particular modulo operation to the left in ACCUMULATOR and so that it is merged with the next portion of INTERMEDIATE VALUE to form the basis of the next modulo operation.

IMPLEMENTATION MECHANISMS

Although embodiments are described herein in the context of providing secure communication between two participants, the approach may be used with any number of participants. In addition, the approach may be used to encrypt and decrypt messages and/or keys depending upon the requirements of a particular application. For example, the approach may be used in session key and key exchange applications as well as other applications not specifically described herein. The "Applied Cryptography" reference described herein provides additional examples of encryption applications to which the approach described herein is also applicable.

In the preferred embodiment, the processes shown in FIG. 2, FIG. 3, FIG. 4A, and FIG. 4B may be implemented as one or more computer-executed instructions, processes, programs, subroutines, functions, or their equivalents For example, in an embodiment, each location 102, 104 is a general-purpose computer of the type shown in FIG. 6 and described herein in connection with FIG. 6. The cryptographic devices 110, 114 and the key generators 108, 112 are one or more computer-executed instructions, processes, programs, subroutines, functions, or their equivalents.

An example software implementation of an embodiment is provided in Appendix A in the form of a C program listing. Embodiments may be implemented in other programming languages. Moreover, embodiments may be implemented as discrete hardware circuitry, a plurality of computer instructions (computer software), or a combination of discrete hardware circuitry and computer instructions.

HARDWARE OVERVIEW

Figure 8:
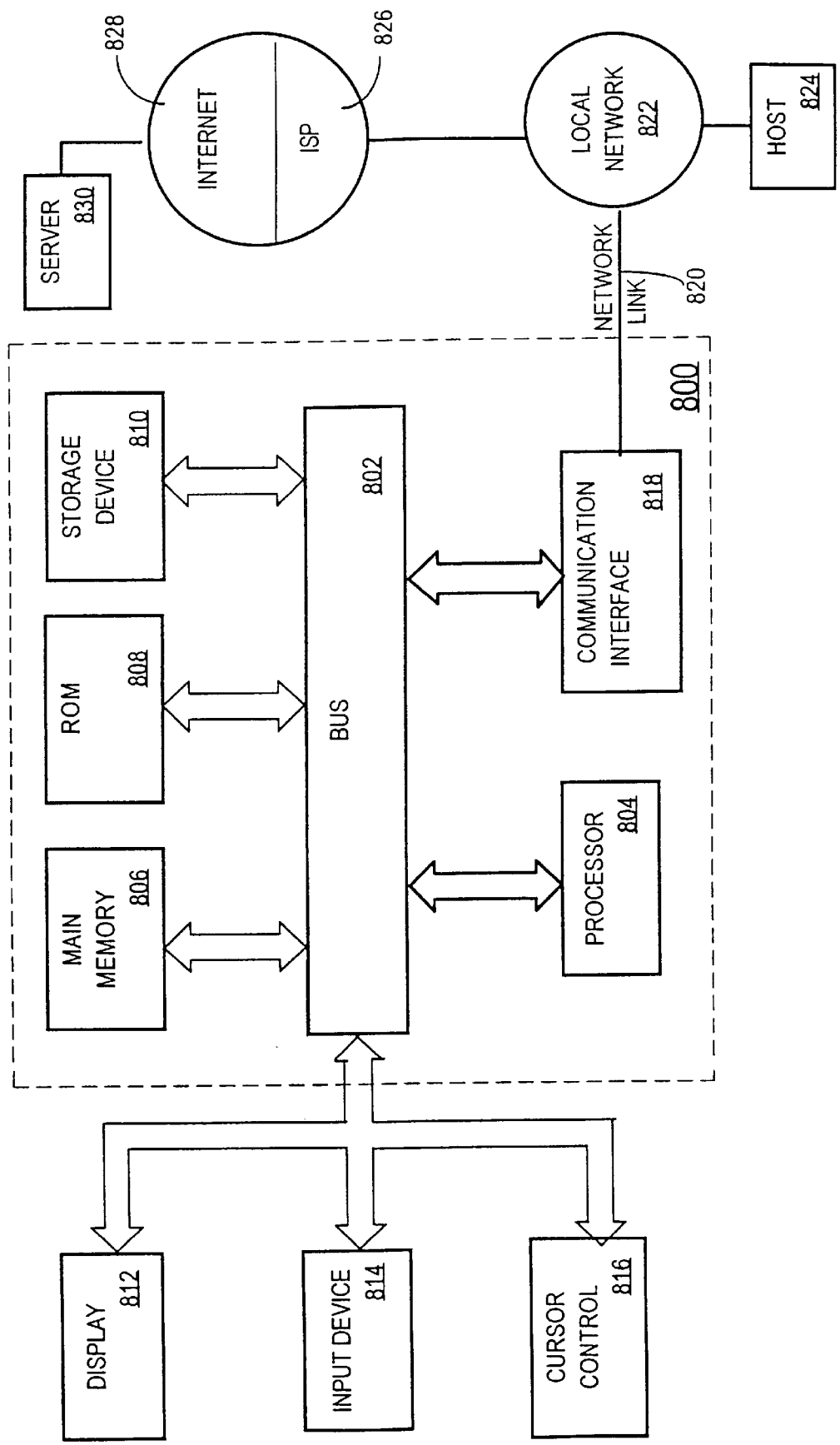
FIG. 8 is a block diagram of a computer system on which embodiments may be implemented.

FIG. 8 is a block diagram that illustrates a computer system 800 upon which an embodiment may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Embodiments are related to the use of computer system 800 to implement a public key exchange encryption approach for securely exchanging data between participants. According to one embodiment, the public key exchange encryption approach is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. One such downloaded application provides a public key exchange encryption approach for securely exchanging data between participants as described herein.

The received code may be executed by processor 804 as it is received, and/or stored in storage device 810, or other non-volatile storage for later execution. In this manner, computer system 800 may obtain application code in the form of a carrier wave.

The techniques described herein provide several advantages over prior public key exchange encryption approaches for securely exchanging data between participants. In particular, allocating sufficient memory in a single allocation and performing iterative multiplication operations so that public and private keys may be determined in the allocated memory avoids having to allocate additional memory while determining the public and private keys. Avoiding operations to allocate additional memory reduces the amount of system resources and time required to determine the public and private keys. Using a single memory allocation also reduces the number of memory to memory operations, further reducing the amount of system resources and time required to determine the public and private keys. Tracking the amount of memory used while determining the public and private keys ensures that only the memory locations containing meaningful intermediate values of the public and private keys are operated on.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

---

APPENDIX A

```
//
//   DHOpt.c - Diffie-Hellman support routines (with optimization).
//
#include <windows .h>
#include <stdlib.h>
#include <stdio.h>
BOOL    bigWWMul(WORD * pwPower, WORD wMaxSize, WORD * pwCurSize, WORD wY);
WORD    bigWWMod(WORD * pwPower, WORD wCurSize, WORD wP);
WORD    wNumBitsDw(DWORD dwx);
//
//   Return z = y ^ x % p
//
DWORD dwDhZ(DWORD dwY, DWORD dwX, DWORD dwP)
{
        WORD *      pwPower;
        WORD        wY;
        WORD        wX;
        WORD        wP;
        DWORD       dwAccum = 0xFFFFFFFF;   // Assume error
        WORD        wMaxSize = 0;
        WORD        wCurSize;
        WORD        wI;
```

-continued

APPENDIX A

```
        pwPower = NULL;                    // In case we short circuit alloc
//    Verify input parameters in range
        if((dwY>0) && (dwY<=0xFFFF) && (dwX<=0xFFFF) && (dwP<=0xFFFF))
        {
            wY = (WORD)dwY;
            wX = (WORD)dwX;
            wP = (WORD)dwP;
//    Determine maximum size of intermediate value
            if(wX!=0)
                wMaxSize = ((wNumBitsDw(dwY) * wX) + (sizeof(WORD)*8 - 1)) /
                    (sizeof (WORD) *8);
//    Ensure maximum size is non-zero
            if(wMaxSize < 1)
                wMaxSize = 1;
//    Note: calloc clears allocated memory to zero
            pwPower = calloc(wMaxSize, sizeof(WORD));
        }
//    Continue only if no allocation error
        if (pwPower!=NULL)
        {
            wCurSize = 1;
//    Detect special case, any non-zero value raised to zero power is one
            if (wX==0)
            {
                pwPower[0] = 1;
            }
            else
            {
                pwPower[0] = wY;
                for(wI = 1; wI < wX; wI++)
                {
                    if (bigWWMul (pwPower, wMaxSize, &wCurSize, wY)==FALSE)
                        break;
                }
            }
            dwAccum = (DWORD)bigWWMod(pwPower, wCurSize, wP);
            free(pwPower);
        }
        return dwAccum;
}
//
//    Calculate [pwPower] * wY using wMaxSize and pwCurSize to
//        characterize the current and maximum size of [pwPower]
//
BOOL    bigWWMul(WORD * pwPower, WORD wMaxSize, WORD * pwCurSize,
                    WORD wY)
{
    DWORD    dwAcc = 0;
    WORD     wCurSize;
    WORD     wI;
    BOOL     retVal = TRUE;
    wCurSize = *pwCurSize;
    for(wI = 0; wI < wCurSize; wI++)
    {
        dwAcc += (DWORD)(pwPower[wI]) * (DWORD)wY;
        pwpower[wI] = (WORD)dwAcc;
        dwAcc >>= 16;
    }
    if (dwAcc!=0)
    {
        if (wCurSize<wMaxSize)
        {
            pwPower[wCurSize] = (WORD)dwAcc;
            *pwCurSize += 1;
        }
        else
            retVal = FALSE;
    }
    return retVal;
}
//    Calculate [pwPower] modulo wP using wCurSize to
//        characterize the current size of [pwPower]
//
WORD    bigWWMod(WORD * pwPower, WORD wCurSize, WORD wP)
{
    DWORD dwAccum;
    wCurSize -= 1;
```

-continued

APPENDIX A

```
    dwAccum = pwPower[wCurSize] % wP;
    if (wCurSize!=0)
    {
        do
        {
            wCurSize -= 1;
            dwAccum = ((dwAccum>>16) | pwPower[wCurSize]) % wP;
        } while(wCurSize);
    }
    return (WORD)dwAccum;
}
//
//  Calculate an upper limit of the number of significant bits in dwX
//
WORD  wNumBitsDw(DWORD dwX)
{
    WORD  wRetVal;
    wRetVal = 0;
    while(dwX != 0)
    {
        dwX >>= 1;
        wRetVal += 1;
    }
    return wRetVal;
}
```

What is claimed is:

1. A method for securely exchanging data between a first computer at a first location and a second computer at a second location, the method comprising the computer-implemented steps of:

generating a public encryption key, wherein the public encryption key is defined by the equation $Y=G^x \bmod P$, wherein G and x are integers and P is a prime number, by:

determining a maximum possible size of computer memory for storing an intermediate value used to determine the value of $G^x$;

dynamically allocating intermediate memory of a computer to store the intermediate value of the maximum possible size once each time the method is carried out;

once each time the method is carried out, initializing the intermediate memory to the value of G as expressed by the maximum possible size;

determining the value of $G^x$ in the intermediate memory by performing iterative multiplication operations on portions of the intermediate value; and determining the value of $G^x \bmod P$ by performing iterative modulo operations on portions of the intermediate value;

encrypting the data using the public encryption key to generate encrypted data; and providing the encrypted data from the first computer to the second computer.

2. A method as recited in claim 1, wherein:

the maximum possible size of the intermediate value is the maximum number of words required to store the intermediate value, the step of determining a maximum possible size of an intermediate value used to determine the value of $G^x$ includes determining a maximum number of words required to store the intermediate value, wherein the maximum number of words is equal to the truncated integer value of:

(((number of significant bits in G)*x)+((word size*8)−1))/(word size*8), wherein "word size" is the number of bastes in a word used to determine the value of $G^x$, and the step of dynamically allocating intermediate memory to store the intermediate value of the maximum possible size includes dynamically allocating intermediate memory having the maximum number of words required to store the intermediate value.

3. A method as recited in claim 2, wherein the intermediate memory (INTERMEDIATE MEMORY) is an array of words, and the step of determining the value of $G^x$ in the intermediate memory includes the steps of:

a) dynamically allocating accumulator memory (ACCUMULATOR MEMORY) of the calculated maximum number of words required to store the intermediate value, the ACCUMULATOR MEMORY having a first portion and a second portion, wherein the first portion is relatively more significant than the second portion, b) initializing both the ACCUMULATOR MEMORY and an index variable (INDEX) to "0", c) loading the sum of the current value of ACCUMULATOR MEMORY and (INTERMEDIATE MEMORY*G) into ACCUMULATOR MEMORY, d) loading the value of second portion (ACCUMULATOR) into INTERMEDIATE MEMORY, e) loading the value of first portion (ACCUMULATOR) into second portion (ACCUMULATOR), f) initializing first portion (ACCUMULATOR) with 0, g) incrementing INDEX by 1, h) repeating steps c) through g) until INDEX is equal to or greater than the current size (CUR SIZE) of INTERMEDIATE VALUE, wherein CUR SIZE is the number of words of INTERMEDIATE MEMORY containing a non-zero value, i) repeating steps b) through h) (x−1) times, and j) providing the value of INTERMEDIATE VALUE as the value of $G^x$.

4. A method as recited in claim 3, further including the steps of, when the value of second portion (ACCUMULATOR) is not equal to zero and CUR SIZE is less than the maximum possible size of the intermediate value, performing the steps of:

loading the value of second portion into INTERMEDIATE MEMORY; and incrementing CUR SIZE.

5. A method as recited in claim 3, further including the step of providing an error status when the value of second portion (ACCUMULATOR) is not equal to zero and CUR SIZE is equal to or greater than the maximum possible size of the intermediate value.

6. A method as recited in claim 3, wherein determining the value of $G^x$ mod P includes:
  a) decrementing CUR SIZE by 1,
  b) loading the value of (INTERMEDIATE MEMORY mod P) into ACCUMULATOR,
  c) determining whether CUR SIZE is equal to 0,
  d) if CUR SIZE is not equal to 0, then performing the steps of
    i) decrementing CUR SIZE by 1,
    ii) loading the value of second portion (ACCUMULATOR) into first portion (ACCUMULATOR),
    iii) loading the value of INTERMEDIATE MEMORY into second portion (ACCUMULATOR),
    iv) loading the value of (ACCUMULATOR mod P) into ACCUMULATOR,
  e) repeating steps c) and d) until CUR SIZE is equal to 0, and
  d) providing the value of second portion (ACCUMULATOR) as the value of $G^x$ mod P.

7. A computer system for securely transmitting data to another computer system, the computer system comprising:
  one or more processors; and
  a memory communicatively coupled to the one or more processors, wherein the memory includes one or more sequences of instructions which, when executed by the one or more processors, cause the one or more processors to perform the steps of:
    generating a public encryption key, wherein the public encryption key is defined by the equation $Y=G^x$ mod P, wherein G and x are integers and P is a prime number, by:
      determining a maximum possible size of a computer memory for an intermediate value to be used to determine the value of $G^x$ once each time the steps are carried out;
      once for the generation of the public encryption key, dynamically allocating intermediate memory of a computer to store the intermediate value of the maximum possible size;
      initializing the intermediate memory to the value of G as expressed by the maximum possible size;
      determining the value of $G^x$ in the intermediate memory by performing iterative multiplication operations on portions of the intermediate value; and
      determining the value of $G^x$ mod P by performing iterative modulo operations on portions of the intermediate value;
    encrypting the data using the public encryption key to generate encrypted data; and
    transmitting the encrypted data to the other computer system.

8. A computer system as recited in claim 7, wherein:
the maximum possible size of the intermediate value is the maximum number of words required to store the intermediate value, the step of determining a maximum possible size of an intermediate value used to determine the value of $G^x$ includes the step of determining a maximum number of words required to store the intermediate value, wherein the maximum number of words is equal to the value of:

(((number of significant bits in G)*x)+((word size*8)−1))/(word size*8), wherein "word size" is the number of bytes in a word used to determine the value of $G^x$, and the step of dynamically allocating intermediate memory to store the intermediate value of the maximum possible size includes dynamically allocating intermediate memory having the maximum number of words required to store the intermediate value.

9. A computer system as recited in claim 8, wherein intermediate memory (INTERMEDIATE MEMORY) is an array of words, and the step of determining the value of $G^x$ in the intermediate memory includes the steps of:
  a) dynamically allocating accumulator memory (ACCUMULATOR MEMORY) of the calculated maximum number of words required to store the intermediate value, the ACCUMULATOR MEMORY having a first portion and a second portion, wherein the first portion is relatively more significant than the second portion,
  b) initializing both the ACCUMULATOR MEMORY and an index variable (INDEX) to "0",
  c) loading the sum of the current value of ACCUMULATOR MEMORY and (INTERMEDIATE MEMORY*G) into ACCUMULATOR MEMORY,
  d) loading the value of second portion (ACCUMULATOR) into INTERMEDIATE MEMORY,
  e) loading the value of first portion (ACCUMULATOR) into second portion (ACCUMULATOR),
  f) initializing first portion (ACCUMULATOR) with 0,
  g) incrementing INDEX by 1,
  h) repeating steps c) through g) until INDEX is equal to or greater than the current size (CUR SIZE) of INTERMEDIATE VALUE, wherein CUR SIZE is the number of words of INTERMEDIATE MEMORY containing a non-zero value,
  i) repeating steps b) through h) (x−1) times, and
  j) providing the value of INTERMEDIATE VALUE as the value of $G^x$.

10. A computer system as recited in claim 9, wherein the memory further includes instructions for, when the value of second portion (ACCUMULATOR) is not equal to zero and CUR SIZE is less than the maximum possible size of the intermediate value, performing the steps of:
  loading the value of second portion (ACCUMULATOR) into INTERMEDIATE MEMORY; and
  incrementing CUR SIZE.

11. A computer system as recited in claim 9, wherein the memory further includes instructions for providing an error status when the value of second portion (ACCUMULATOR) is not equal to zero and CUR SIZE is equal to or greater than the maximum possible size of the intermediate value.

12. A computer system as recited in claim 9, wherein the memory further includes instructions for determining the value of $G^x$ mod P, wherein P is an integer, by performing the steps of:
  a) decrementing CUR SIZE by 1,
  b) loading the value of (INTERMEDIATE MEMORY mod P) into ACCUMULATOR,
  c) determining whether CUR SIZE is equal to 0,

23 d) if CUR SIZE is not equal to 0, then performing the steps of
   i) decrementing CUR SIZE by 1,
   ii) loading the value of second portion (ACCUMULATOR) into first portion (ACCUMULATOR),
   iii) loading the value of INTERMEDIATE MEMORY into second portion (ACCUMULATOR),
   iv) loading the value of (ACCUMULATOR mod P) into ACCUMULATOR,
e) repeating steps c) and d) until CUR SIZE is equal to 0, and
f) providing the value of second portion (ACCUMULATOR) as the value of $G^x$ mod P.

13. A computer-readable medium carrying one or more sequences of one or more instructions for securely exchanging data between a first computer at a first location and a second computer at a second location, the one or more sequences of one or more instructions including instructions which, when executed by one or more processors, cause the one or more processors to perform the steps of:
   generating a public encryption key, wherein the public encryption key is defined by the equation $Y=G^x$ mod P, wherein G and x are integers and P is a prime number, by:
      determining a maximum possible size of computer memory for storing an intermediate value used to determine the value of $G^x$;
      dynamically allocating intermediate memory of a computer to store the intermediate value of the maximum possible size once each time the method is carried out;
      once each time the method is carried out, initializing the intermediate memory to the value of G as expressed by the maximum possible size;
      determining the value of $G^x$ in the intermediate memory by performing iterative multiplication operations on portions of the intermediate value; and
      determining the value of $G^x$ mod P by performing iterative modulo operations on portions of the intermediate value;
   encrypting the data using the public encryption key to generate encrypted data; and
   providing the encrypted data from the first computer to the second computer.

14. A computer-readable medium as recited in claim 13, wherein:
   the maximum possible size of the intermediate value is the maximum number of words required to store the intermediate value,
   the step of determining a maximum possible size of an intermediate value used to determine the value of $G^x$ includes determining a maximum number of words required to store the intermediate value, wherein the maximum number of words is equal to the truncated integer value of:
      (((number of significant bits in G)*x)+((word size*8)−1))/(word size*8),
      wherein "word size" is the number of bytes in a word used to determine the value of $G^x$, and
   the step of dynamically allocating intermediate memory to store the intermediate value of the maximum possible size includes dynamically allocating intermediate memory having the maximum number of words required to store the intermediate value.

15. A computer-readable medium as recited in claim 13, wherein the intermediate memory (INTERMEDIATE

24

MEMORY) is an array of words, and the step of determining the value of $G^x$ in the intermediate memory includes the steps of:
   a) dynamically allocating accumulator memory (ACCUMULATOR MEMORY) of the calculated maximum number of words required to store the intermediate value, the ACCUMULATOR MEMORY having a first portion and a second portion, wherein the first portion is relatively more significant than the second portion,
   b) initializing both the ACCUMULATOR MEMORY and an index variable (INDEX) to "0",
   c) loading the sum of the current value of ACCUMULATOR MEMORY and (INTERMEDIATE MEMORY*G) into ACCUMULATOR MEMORY,
   d) loading the value of second portion (ACCUMULATOR) into INTERMEDIATE MEMORY,
   e) loading the value of first portion (ACCUMULATOR) into second portion (ACCUMULATOR),
   f) initializing first portion (ACCUMULATOR) with 0,
   g) incrementing INDEX by 1,
   h) repeating steps c) through g) until INDEX is equal to or greater than the current size (CUR SIZE) of INTERMEDIATE VALUE, wherein CUR SIZE is the number of words of INTERMEDIATE MEMORY containing a non-zero value,
   i) repeating steps b) through h) (x−1) times, and
   j) providing the value of INTERMEDIATE VALUE as the value of $G^x$.

16. A computer-readable medium as recited in claim 15, wherein determining the value of $G^x$ mod P includes:
   a) decrementing CUR SIZE by 1,
   b) loading the value of (INTERMEDIATE MEMORY mod P) into ACCUMULATOR,
   c) determining whether CUR SIZE is equal to 0,
   d) if CUR SIZE is not equal to 0, then performing the steps of
      i) decrementing CUR SIZE by 1,
      ii) loading the value of second portion (ACCUMULATOR) into first portion (ACCUMULATOR),
      iii) loading the value of INTERMEDIATE MEMORY into second portion (ACCUMULATOR),
      iv) loading the value of (ACCUMULATOR mod P) into ACCUMULATOR,
   e) repeating steps c) and d) until CUR SIZE is equal to 0, and
   d) providing the value of second portion (ACCUMULATOR) as the value of $G^x$ mod P.

17. A computer-readable medium as recited in claim 13, further including the steps of, when the value of second portion (ACCUMULATOR) is not equal to zero and CUR SIZE is less than the maximum possible size of the intermediate value, performing the steps of:
   loading the value of second portion (ACCUMULATOR) into INTERMEDIATE MEMORY; and
   incrementing CUR SIZE.

18. A computer-readable medium as recited in claim 13, further including the step of providing an error status when the value of second portion (ACCUMULATOR) is not equal to zero and CUR SIZE is equal to or greater than the maximum possible size of the intermediate value.

* * * * *